United States Patent
Kanekami et al.

(10) Patent No.: US 7,317,667 B2
(45) Date of Patent: Jan. 8, 2008

(54) WOBBLE SIGNAL EXTRACTION CIRCUIT AND OPTICAL DISK DEVICE

(75) Inventors: Youichi Kanekami, Osaka (JP); Hiroyasu Morikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 196 days.

(21) Appl. No.: 10/545,893

(22) PCT Filed: Oct. 19, 2004

(86) PCT No.: PCT/JP2004/015441

§ 371 (c)(1), (2), (4) Date: Aug. 17, 2005

(87) PCT Pub. No.: WO2005/043516

PCT Pub. Date: May 12, 2005

(65) Prior Publication Data

US 2006/0256671 A1    Nov. 16, 2006

(30) Foreign Application Priority Data

Oct. 31, 2003    (JP)    ............... 2003-372481

(51) Int. Cl.
*G11B 7/00* (2006.01)
(52) U.S. Cl. ............... 369/44.13; 369/47.28
(58) Field of Classification Search ............... 369/44.13
See application file for complete search history.

(56) References Cited

U.S. PATENT DOCUMENTS

| | | | |
|---|---|---|---|
| 6,172,956 B1 * | 1/2001 | Fuji | 369/47.28 |
| 6,563,773 B1 * | 5/2003 | Yanagisawa et al. | 369/44.41 |
| 6,603,726 B1 | 8/2003 | Yoshida et al. | |
| 6,888,783 B2 * | 5/2005 | Maegawa | 369/53.2 |
| 7,031,248 B2 * | 4/2006 | Kurobe | 369/124.12 |
| 7,099,244 B2 * | 8/2006 | Nakata et al. | 369/47.19 |
| 7,196,998 B2 * | 3/2007 | Hsiao | 369/59.2 |
| 2001/0026512 A1 | 10/2001 | Nishimura et al. | |
| 2001/0028613 A1 * | 10/2001 | Okamoto et al. | 369/44.25 |
| 2004/0233818 A1 * | 11/2004 | Shim et al. | 369/59.25 |
| 2004/0264321 A1 * | 12/2004 | Kim et al. | 369/47.22 |
| 2006/0176785 A1 * | 8/2006 | Kobayashi et al. | 369/44.28 |
| 2006/0280058 A1 * | 12/2006 | Tomioka | 369/44.13 |
| 2007/0030769 A1 * | 2/2007 | Nishimura et al. | 369/44.13 |

FOREIGN PATENT DOCUMENTS

| | | |
|---|---|---|
| JP | 08-194969 | 7/1996 |
| JP | 2000-311344 A | 11/2000 |
| JP | 2001-266486 A | 9/2001 |
| JP | 2004-227643 A | 8/2004 |

* cited by examiner

*Primary Examiner*—Wayne Young
*Assistant Examiner*—Van T. Pham
(74) *Attorney, Agent, or Firm*—McDermott Will & Emery LLP

(57) ABSTRACT

A wobble signal extraction circuit for extracting a wobble signal from a first optical disk signal containing a wobble signal component caused by a wobble formed on a surface of an optical disk and a second optical disk signal containing a wobble signal component of a reversed phase to that of the first optical disk signal, wherein signal level fixing sections (24a; and 24b) fix the first and second optical disk signals to a predetermined level when a discontinuity of the wobble is detected.

4 Claims, 7 Drawing Sheets

WOBBLE SIGNAL EXTRACTION CIRCUIT AND OPTICAL DISK DEVICE

RELATED APPLICATION

This application is a national phase of PCT/JP2004/015441 filed on Oct. 19, 2004, which claims priority from Japanese Application No. 2003-372481 filed on Oct. 31, 2003, the disclosures of which Applications are incorporated by reference herein. The benefit of the filing and priority dates of the International and Japanese Applications is respectfully requested.

TECHNICAL FIELD

The present invention relates to a technique for recording/reproducing information to/from an optical disk to/from which information can be optically recorded/reproduced, and more particularly to a circuit technique for use in an optical disk apparatus for spinning an optical disk and obtaining track position information based on a wobble formed on the surface of the optical disk, by which a wobble signal caused by the wobble is accurately extracted from a signal reproduced from the optical disk.

BACKGROUND ART

Figure 6:
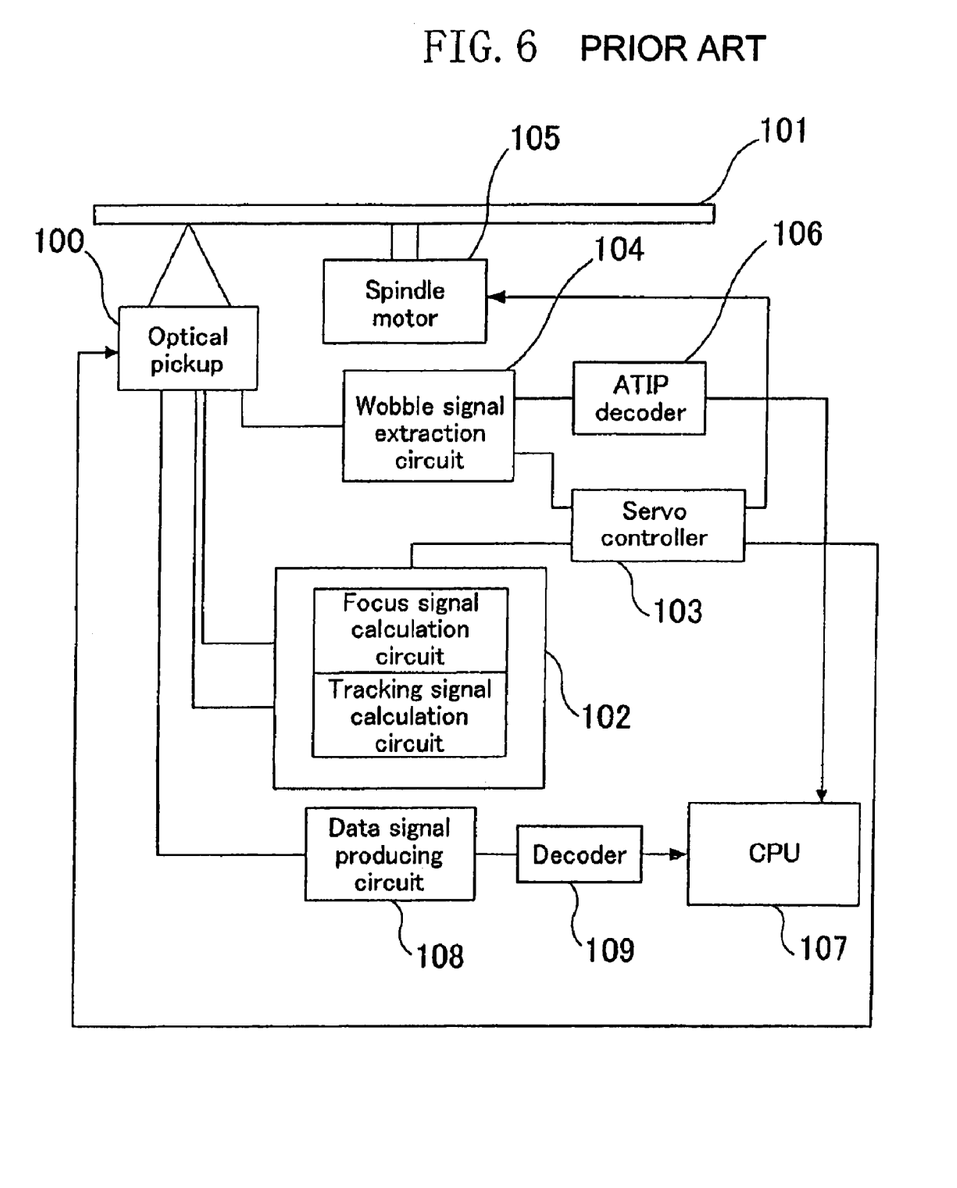
FIG. 6 is a diagram showing a configuration of a conventional optical disk apparatus.

A conventional optical disk apparatus records/reproduces data to/from an optical disk while performing a tracking operation based on a guide groove that is formed in advance on the surface of the optical disk so as to be winding in the radial direction, i.e., a wobble. FIG. 6 shows a configuration of a CD-R recording/reproduction apparatus as an example of a conventional optical disk apparatus. An optical pickup 100 irradiates an optical disk 101 being spun at a certain speed with laser light, and the reflected light is detected by a divided photodetector and converted into an electric signal. For the obtained signal, a servo signal producing circuit 102 produces a focus and tracking error signal to perform a focus and tracking servo control of the optical pickup 100 through a servo controller 103.

Figure 7:
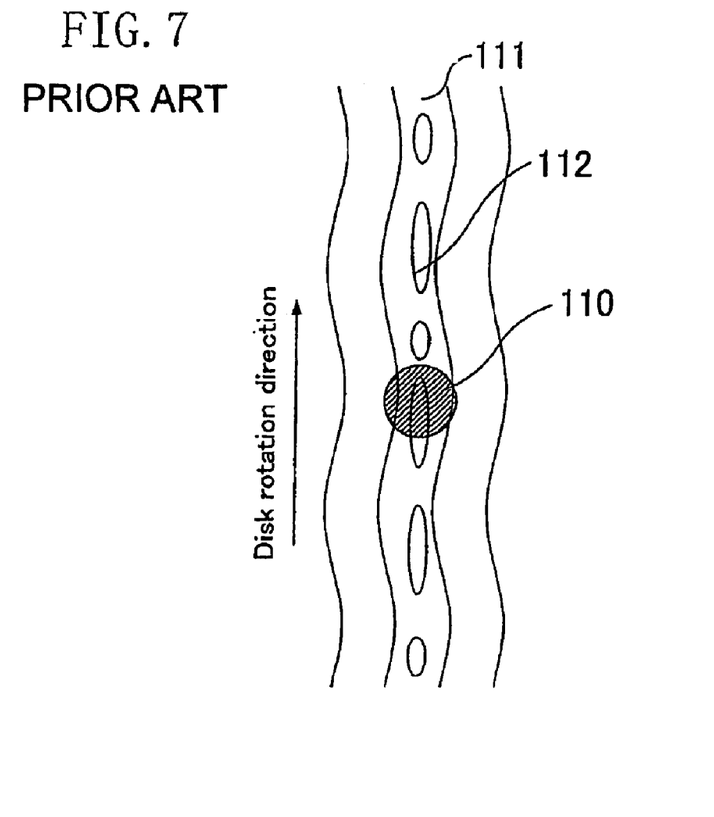
FIG. 7 is an enlarged view of a surface of an optical disk under a servo control.

FIG. 7 is a diagram showing on an enlarged scale the surface of the optical disk 101 under a servo control. Under a servo control, laser light output from the optical pickup 100 is condensed into a spot as shown by a laser spot 110, and the spot is controlled by a tracking control so as to be always along a guide groove 111. If information is recorded on the optical disk 101, there are pits 112 along the guide groove 111, and the optical pickup 100 produces a signal based on the reflected light whose intensity changes depending on the presence/absence of the pits 112.

Referring back to FIG. 6, a wobble signal extraction circuit 104 extracts a wobble signal caused by the guide groove 111 shown in FIG. 7, i.e., a wobble. The servo controller 103 performs a spindle servo control by controlling the rotational speed of a spindle motor 105 so that the frequency of the wobble signal becomes equal to an intended value. Absolute time information (ATIP: Absolute Time In Pre-groove) that indicates address information of the optical disk 101 is embedded in the wobble signal. An ATIP decoder 106 decodes ATIP from the wobble signal, and sends, to a CPU 107, position information of the optical pickup 100 in the optical disk 101. A data signal producing circuit 108 produces a data signal from the signal produced by the optical pickup 100. A decoder 109 decodes the data signal produced by the data signal producing circuit 108 to decode the signal recorded on the optical disk 101.

Figure 8:
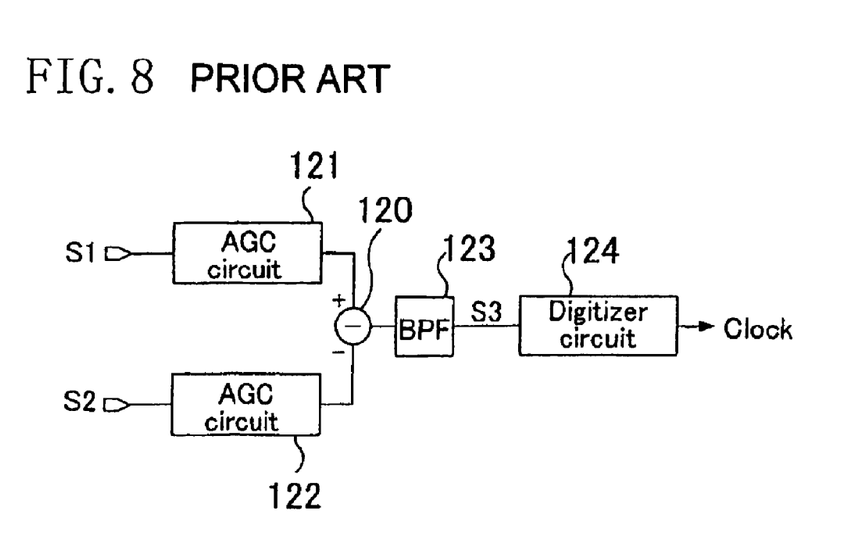
FIG. 8 is a diagram for illustrating a principle of a wobble signal extraction operation performed by a wobble signal extraction circuit.

The wobble signal extraction circuit 104 of the above optical disk apparatus will now be described in detail. FIG. 8 shows a configuration of the conventional wobble signal extraction circuit 104. The wobble signal extraction circuit 104 receives, from the optical pickup 100, optical disk signals S1 and S2 containing an RF signal component being a data reproduction signal and a wobble signal component caused by a wobble formed on the optical disk 101, and subtracts, at a subtracter 120, the optical disk signal S2 from the optical disk signal S1 to extract a wobble signal.

Figure 9:
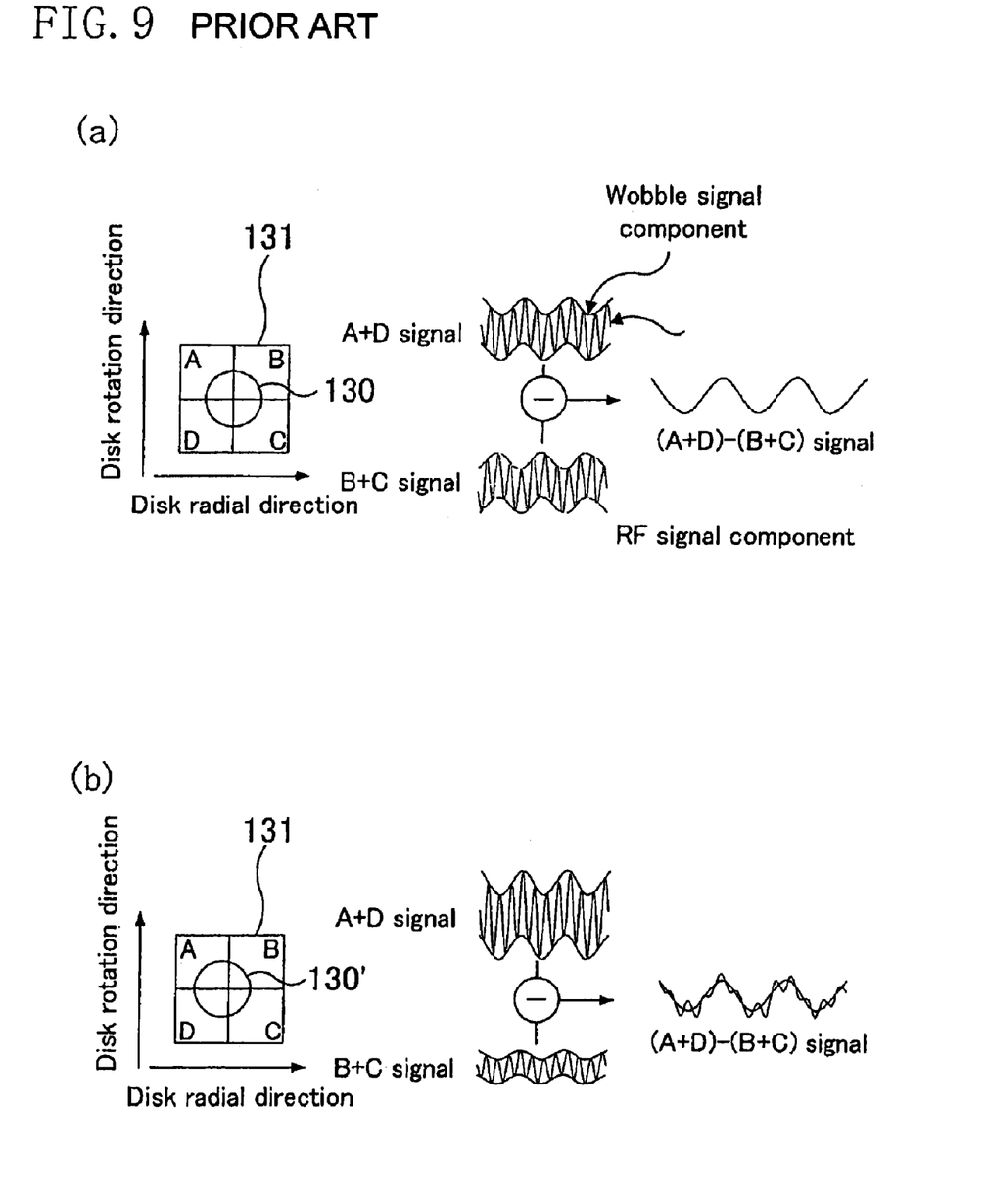
FIG. 9 shows graphs each showing the relationship between an extracted wobble signal and a signal obtained by digitizing the extracted wobble signal.

FIG. 9 show diagrams for illustrating the principle of the wobble signal extraction operation performed by the wobble signal extraction circuit 104. When reproducing a recorded optical disk, light 130 is ideally reflected off the disk surface equally by portions A, B, C and D of a photodetector 131, as shown in FIG. 9(a). Then, an A+D signal produced from the portions A and D arranged next to each other in the disk rotation direction (i.e., the optical disk signal S1 shown in FIG. 8) and a B+C signal produced from the portions B and C similarly arranged next to each other in the disk rotation direction (i.e., the optical disk signal S2 shown in FIG. 8) have RF signal components of the same phase and of the same amplitude, and have wobble signal components of reversed phases and of the same amplitude. Therefore, by subtracting the optical disk signal S2 from the optical disk signal S1 with the subtracter 120 shown in FIG. 8, the RF signal components contained in these signals are canceled out, whereby an (A+D)−(B+C) signal that contains only the wobble signal component can be extracted as the output signal of the subtracter 120.

However, due to factors such as the limit on the precision in the placement of the photodetector 131 when manufacturing an optical disk apparatus, light 130' is reflected asymmetrically with respect to the photodetector 131 as shown in FIG. 9(b). Then, the RF signal components and the wobble signal components contained in the A+D signal and the B+C signal will be of different amplitudes. In view of this, the optical disk signals S1 and S2 are passed to the subtracter 120 after being adjusted through automatic gain controllers (hereinafter referred to as "AGC circuits") 121 and 122 so that they will have the same amplitude. Moreover, an RF signal component remaining in the output from the subtracter 120 is removed by a bandpass filter 123, thus extracting a wobble signal S3. Then, the extracted wobble signal S3 is digitized by a digitizer circuit 124, and is used as a clock in the optical disk apparatus for a spindle servo control and for obtaining disk address information (see, for example, Patent Document 1).

Optical disks currently available in the market include WORM-type optical disks including DVD-R in addition to CD-R, and rewritable optical disks such as CD-RW, DVD-RAM and DVD-RW. A recording/reproduction apparatus compatible with these optical disks also extracts a wobble signal from an optical disk in a manner similar to that described above to produce a necessary clock signal when recording data.

(Patent Document 1) Japanese Laid-Open Patent Publication No. 8-194969

DISCLOSURE OF THE INVENTION

Problems to be Solved by the Invention

A land/groove recording method is employed for DVD-RAM disks. In the land/groove recording method, address information are arranged in a staggered pattern along the track of a land portion and along the track of a groove portion. Therefore, the wobble signal will not be a continuous signal, but is cut off when reading a CAPA (Complimentary Allocated Pit Addressing) portion. Therefore, when reading a CAPA portion, i.e., when the output laser light moves from a DATA portion into a CAPA portion or from a CAPA portion into a DATA portion, the DC level and the amplitude of the optical disk signals input to the subtracter 120 shown in FIG. 8 may vary rapidly to exceed the acceptable input amplitude range of the subtracter 120, thus saturating the subtracter 120. In this case, it requires some time after the read position moves into a DATA portion and before the subtracter 120 recovers from the saturated state back to the normal state, and the response characteristics of the subtracter 120 during this recovery period will be different from those in the normal state.

With DVD-R/RW, when reading a land pre-pit area on the disk surface, a land pre-pit signal is superimposed on the RF signal. Therefore, as with DVD-RAM, the amplitude level of the signal input to the subtracter 120 or the AGC circuits 121 and 122 shown in FIG. 8 may vary rapidly to exceed the acceptable input amplitude range of the circuit.

In a case where the AGC circuits 121 and 122 are provided preceding the subtracter 120 as shown in FIG. 8, one of the two optical disk signals output from the photo-detector will be missing when reading a CAPA portion, whereby the AGC circuit for which the signal is missing may be saturated.

A countermeasure to the problem above is to set the acceptable input amplitude range of the subtracter 120 to be sufficiently large in view of the DC variation and the amplitude variation. However, this is disadvantageous in terms of the power consumption of the circuit and the circuit area. Even if an HPF (high-pass filter) is provided along a path extending from the light-receiving portion to the subtracter 120, the DC variation cannot be removed since it is a frequency component close to the RF band. Thus, a wobble signal extraction circuit of a CD-R/RW recording/reproduction apparatus is not compatible with DVD-RAM/R/RW, and if it is used with DVD-RAM/R/RW, a wobble signal cannot be obtained stably. Therefore, in order to realize an optical disk apparatus compatible with both CD-R/RW and DVD-RAM/R/RW, it is necessary to implement two different wobble signal extraction circuits. However, this is disadvantageous in terms of the circuit area.

In view of the above, it is an object of the present invention to realize a wobble signal extraction circuit and an optical disk apparatus compatible with various types of optical disks and capable of stable extraction of a wobble signal while suppressing an increase in the circuit scale and power consumption.

MEANS FOR SOLVING THE PROBLEMS

In order to solve the problems above, the present invention provides a wobble signal extraction circuit for extracting a wobble signal from a first optical disk signal containing a wobble signal component caused by a wobble formed on a surface of an optical disk and a second optical disk signal containing a wobble signal component of a reversed phase to that of the first optical disk signal, including first and second signal level fixing sections for fixing the first and second optical disk signals, respectively, to a predetermined level when a discontinuity of the wobble is detected.

With this invention, the first and second optical disk signals are fixed to a predetermined level by first and second signal level fixing sections when a discontinuity of the wobble is detected. Therefore, signals exceeding an acceptable input amplitude range will not be input to a circuit that receives the first and second optical disk signals, e.g., a subtracter, whereby the circuit can have a relatively small acceptable input amplitude range.

Preferably, the wobble signal extraction circuit includes first and second normalizer sections for adjusting amplitudes of the first and second optical disk signals, respectively, to a predetermined magnitude. The first and second signal level fixing sections are provided preceding the first and second normalizer sections, respectively.

Preferably, the wobble signal extraction circuit includes a gain adjustment section for, when the first and second optical disk signals are fixed to the predetermined level respectively by the first and second signal level fixing sections, fixing gains of the first and second normalizer sections to a value used immediately before the first and second optical disk signals are fixed to the predetermined level, or to a predetermined value.

Preferably, the first and second signal level fixing sections perform a sample-and-hold operation on the first and second optical disk signals, respectively, and hold the first and second optical disk signals to the predetermined level when the discontinuity of the wobble is detected.

In order to solve the problems above, the present invention also provides a wobble signal extraction circuit for extracting a wobble signal from a first optical disk signal containing a wobble signal component caused by a wobble formed on a surface of an optical disk and a second optical disk signal containing a wobble signal component of a reversed phase to that of the first optical disk signal, including: a subtracter for subtracting the second optical disk signal from the first optical disk signal; and a signal level fixing section for fixing an output signal of the subtracter to a predetermined level when the discontinuity of the wobble is detected.

With this invention, the output signal of the subtracter is fixed to a predetermined level by the signal level fixing section when a discontinuity of the wobble is detected. Therefore, signals exceeding an acceptable input amplitude range will not be input to a circuit that receives the output signal of the subtracter, e.g., a bandpass filter, whereby the circuit can have a relatively small acceptable input amplitude range.

In order to solve the problems above, the present invention also provides a wobble signal extraction circuit for extracting a wobble signal from a first optical disk signal containing a wobble signal component caused by a wobble formed on a surface of an optical disk and a second optical disk signal containing a wobble signal component of a reversed phase to that of the first optical disk signal, including: a signal switcher for selectively outputting one of the first and second optical disk signals; and a subtracter for subtracting a signal output from the signal switcher from the first optical disk signal. The signal switcher outputs the first optical disk signal when the discontinuity of the wobble is detected.

With this invention, when a discontinuity of the wobble is detected, the first optical disk signal is output from the signal switcher, whereby the two inputs to the subtracter will be of the same value and thus will be canceled out. Therefore, the subtracter can have a relatively small acceptable input amplitude range.

Specifically, the optical disk is in compliance with the DVD-RAM standard or the DVD-R/RW standard, and the discontinuity of the wobble is a CAPA portion or a land pre-pit area.

EFFECTS OF THE INVENTION

As described above, according to the present invention, a wobble signal can be stably extracted with a single wobble signal extraction circuit for various types of optical disks. Thus, the circuit area is reduced as compared with conventional examples where two different wobble extraction circuits are provided. Moreover, the acceptable input amplitude range required for each circuit is suppressed to be small, thereby allowing for an operation with a low power consumption and a low power supply voltage.

BEST MODE FOR CARRYING OUT THE INVENTION

Best modes for carrying out the present invention will now be described with reference to the drawings. Reference numerals used in the drawings include the following.

24, 24a, 24b Signal level fixing section
26a, 26b Normalizer section
27a, 27b Gain adjustment section
28 Signal switcher
23 Subtracter

First Embodiment

Figure 1:
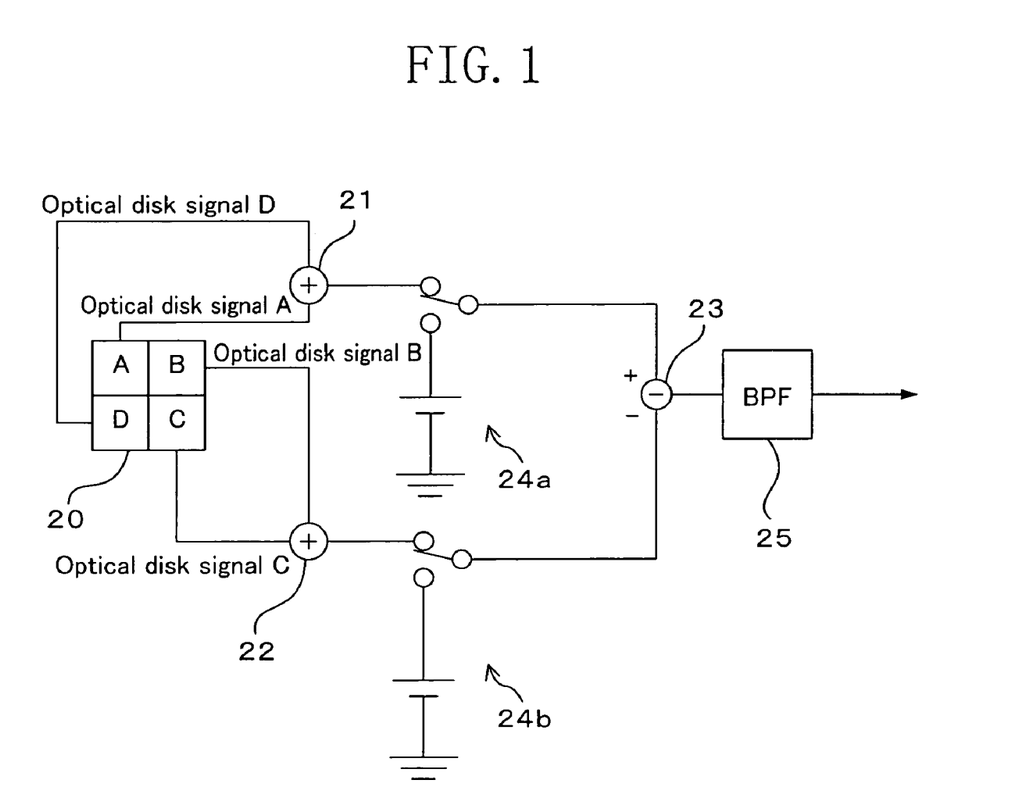
FIG. 1 is a diagram showing a configuration of an optical disk apparatus according to a first embodiment of the present invention.

FIG. 1 shows a configuration of an optical disk apparatus according to a first embodiment of the present invention. The optical disk apparatus of the present embodiment includes a photodetector 20, adder circuits 21 and 22, signal level fixing sections 24a and 24b, a subtracter 23 and a bandpass filter 25. The wobble signal extraction circuit of the present embodiment is a portion including the adder circuits 21 and 22, the signal level fixing sections 24a and 24b, the subtracter 23 and the bandpass filter 25.

Signals obtained by detecting reflected light from an optical disk at portions of the 4-part photodetector 20 are referred to as optical disk signals A, B, C and D. These signals are signals that are read by the photodetector 20 after the photodetector 20 is placed under a tracking and focus servo control so that data can be recorded/reproduced to/from an optical disk, and are signals each obtained by synthesizing an RF signal component and a wobble signal component. From these optical disk signals A to D, the adder circuits 21 and 22 produce a sum signal (A+D) (corresponding to the first optical disk signal) for the inner periphery side of the disk and a sum signal (B+C) (corresponding to the second optical disk signal) for the outer periphery side of the disk. Then, the subtracter 23 subtracts the sum signal (B+C) from the sum signal (A+D), thus removing the RF signal component contained in the two sum signals and extracting the wobble signal. Then, the bandpass filter 25 extracts an intended frequency component from the differential signal (A+D)−(B+C). The wobble signal extraction circuit of the present embodiment will now be described with reference to the case of DVD-RAM.

Figure 2:
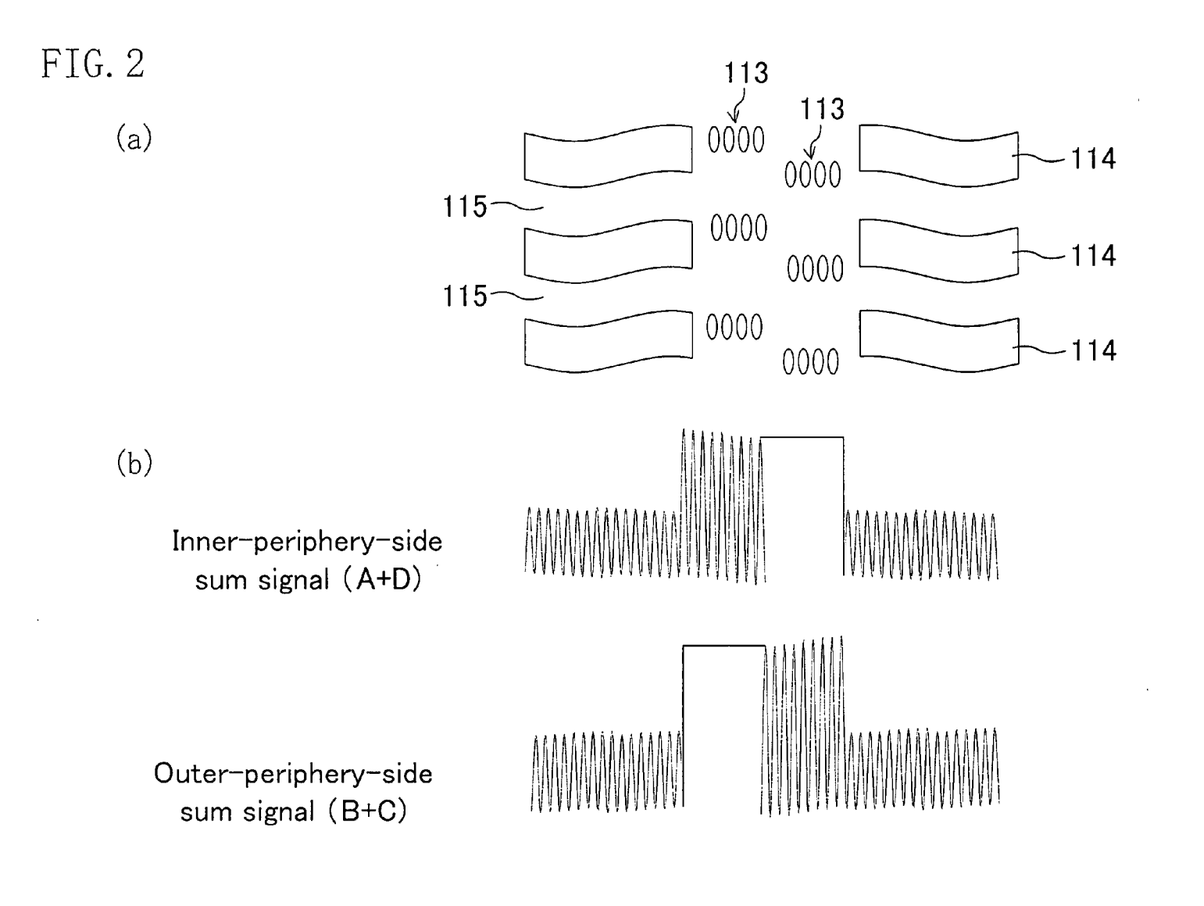
FIG. 2 is a diagram showing an optical disk signal when reading a CAPA portion of a DVD-RAM.

In a DVD-RAM, CAPA portions 113 each representing address information are arranged in a staggered pattern along land portions 114 and groove portions 115 as shown in FIG. 2(a). Therefore, when reading the CAPA portion 113, the DC level and the amplitude level of the optical disk signals vary rapidly as shown in FIG. 2(b). In order to avoid the influence of the level variations, it is necessary to set the acceptable input amplitude range of the subtracter 23 to be sufficiently large. However, it is undesirable as it leads to an increase in the circuit scale and power consumption.

In view of this, the signal level fixing sections 24a and 24b of the wobble signal extraction circuit of the present embodiment fix the input of the subtracter 23 to a predetermined level within the acceptable input amplitude range when reading the CAPA portion 113. Specifically, the signal level fixing sections 24a and 24b receive a signal indicating the detection of a CAPA portion, and fix the input optical disk signals to a predetermined level based on the received signal. The signal indicating the detection of a CAPA portion is an essential signal in a DVD-RAM apparatus, and is produced by a circuit other than those shown in FIG. 1. This removes the optical disk signals when reading the CAPA portion 113, whereby signals exceeding the acceptable input amplitude range will not be input to the subtracter 23. Thus, it is possible to stably extract the wobble signal using, in a DVD-RAM apparatus, a wobble signal extraction circuit that is used in a CD-R/RW apparatus as it is, without setting the acceptable input amplitude range of the subtracter to be particularly large.

Note that in a case where the servo system is realized with a sample-and-hold method, the function of the signal level fixing sections 24a and 24b can be realized with a sample-and-hold circuit. Specifically, the sample-and-hold circuit receives a signal indicating the detection of a CAPA portion, and holds the input optical disk signal at a predetermined level based on the received signal. Thus, in a case where a sample-and-hold method is employed, the function of the signal level fixing sections 24a and 24b is realized without increasing the circuit scale.

Depending on the type of the optical disk placed in the optical disk apparatus, the function of the signal level fixing sections 24a and 24b can be disabled for CD-R/RW and enabled for DVD-RAM, whereby it is possible to provide an optical disk apparatus compatible with both CD-R/RW and DVD-RAM, wherein the wobble signal can be extracted with a single wobble signal extraction circuit for any type of optical disk.

Second Embodiment

Figure 3:
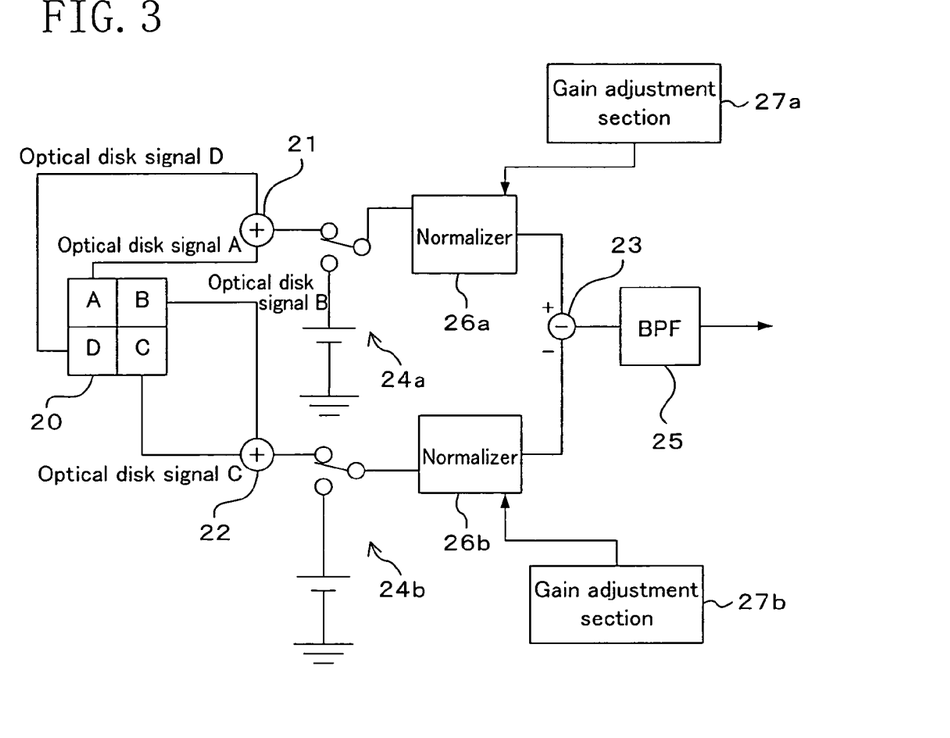
FIG. 3 is a diagram showing a configuration of an optical disk apparatus according to a second embodiment of the present invention.

FIG. 3 shows a configuration of an optical disk apparatus according to a second embodiment of the present invention. The optical disk apparatus of the present embodiment includes normalizer sections 26a and 26b preceding the subtracter 23 in the optical disk apparatus of the first embodiment, and further includes gain adjustment sections 27a and 27b. The normalizer sections 26a and 26b control the amplitudes of the optical disk signals (A+D) and (B+C), respectively, to be input to the subtracter 23 to be at a certain level. Then, the subtracter 23 calculates the difference between the two normalized optical disk signals, whereby it is possible to suppress the leak of an RF signal into an extracted wobble signal, thus obtaining desirable wobble signal extraction characteristics.

The signal level fixing sections 24a and 24b fix the inputs to the normalizer sections 26a and 26b, respectively, to a predetermined level within the acceptable input amplitude range when reading a CAPA portion. This removes the optical disk signals when reading a CAPA portion. Thus, signals exceeding the acceptable input amplitude range will not be input to the normalizer sections 26a and 26b. Thus, it is possible to stably extract the wobble signal using, in a DVD-RAM apparatus, a wobble signal extraction circuit that is used in a CD-R/RW apparatus as it is, without setting the acceptable input amplitude range of the normalizer section to be particularly large.

In a case where the inputs to the normalizer sections 26a and 26b are fixed to a predetermined level by the signal level fixing sections 24a and 24b, if the level becomes near zero, for example, the gains of the normalizer sections 26a and 26b may become maximum and may stay in such a condition thereafter. In view of this, when the inputs of the normalizer sections 26a and 26b are fixed by the signal level fixing sections 24a and 24b to a predetermined level, the gain adjustment sections 27a and 27b fix the gains of the normalizer sections 26a and 26b to a value used immediately before or to a predetermined value. This suppresses transitional responses of the normalizer sections 26a and 26b, thus obtaining desirable transitional response characteristics when the read position moves from a CAPA portion into a DATA portion.

Note that the present embodiment is similar to the first embodiment with respect to the enabling/disabling of the signal level fixing sections 24a and 24b depending on the type of an optical disk placed in the optical disk apparatus, and with respect to the realization of the function of the signal level fixing sections 24a and 24b where the servo system is realized with a sample-and-hold method.

Third Embodiment

Figure 4:
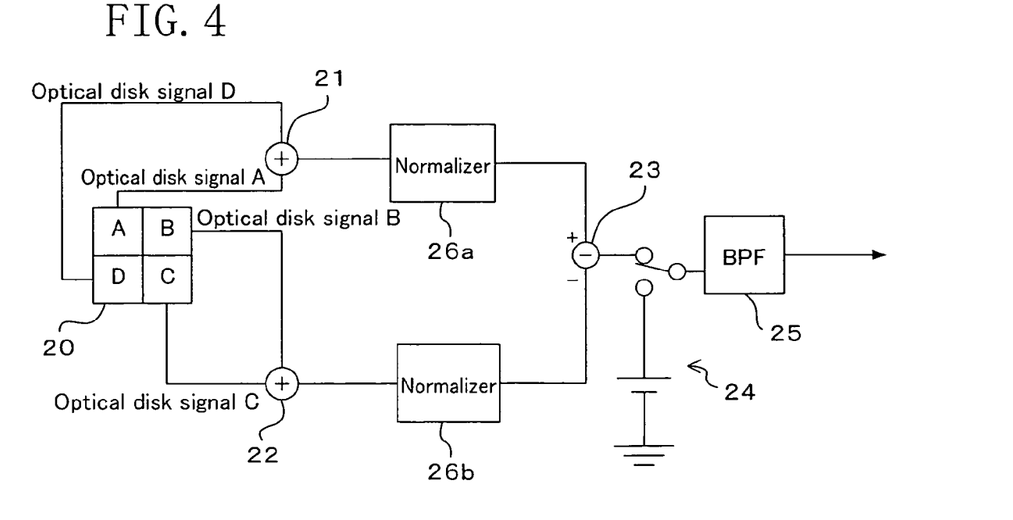
FIG. 4 is a diagram showing a configuration of an optical disk apparatus according to a third embodiment of the present invention.

FIG. 4 shows a configuration of an optical disk apparatus according to a third embodiment of the present invention. The optical disk apparatus of the present embodiment includes the photodetector 20, the adder circuits 21 and 22, the subtracter 23, a signal level fixing section 24, the bandpass filter 25 and the normalizer sections 26a and 26b. The wobble signal extraction circuit of the present embodiment is a portion including the adder circuits 21 and 22, the subtracter 23, the signal level fixing section 24, the bandpass filter 25 and the normalizer sections 26a and 26b.

The signal level fixing section 24 fixes the input to the bandpass filter 25 to a predetermined level within the acceptable input amplitude range when reading a CAPA portion. This removes the optical disk signals when reading a CAPA portion, whereby signals exceeding the acceptable input amplitude range will not be input to the bandpass filter 25. Thus, it is possible to stably extract the wobble signal using, in a DVD-RAM apparatus, a wobble signal extraction circuit that is used in a CD-R/RW apparatus as it is, without setting the acceptable input amplitude range of the bandpass filter to be particularly large.

Note that the present embodiment is similar to the first embodiment with respect to the enabling/disabling of the signal level fixing section 24 depending on the type of an optical disk placed in the optical disk apparatus.

Fourth Embodiment

Figure 5:
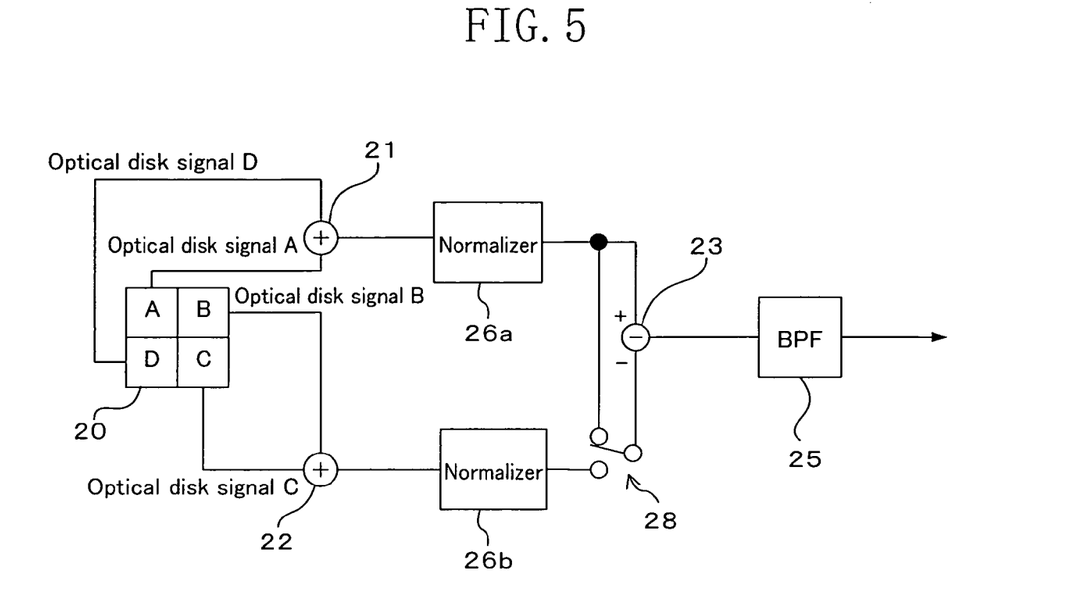
FIG. 5 is a diagram showing a configuration of an optical disk apparatus according to a fourth embodiment of the present invention.

FIG. 5 shows a configuration of an optical disk apparatus according to a fourth embodiment of the present invention. The optical disk apparatus of the present embodiment includes the photodetector 20, the adder circuits 21 and 22, the subtracter 23, the bandpass filter 25, the normalizer sections 26a and 26b and a signal switcher 28. The wobble signal extraction circuit of the present embodiment is a portion including the adder circuits 21 and 22, the subtracter 23, the bandpass filter 25, the normalizer sections 26a and 26b and the signal switcher 28.

The subtracter 23 subtracts the output of the signal switcher 28 from the output of the normalizer section 26a. The signal switcher 28 outputs the signal from the normalizer section 26a when reading a CAPA portion, and otherwise outputs the signal from the normalizer section 26b. Therefore, when reading a CAPA portion, the two optical disk signals input to the subtracter 23 will be of the same value and thus will be canceled out. This removes the optical disk signals when reading a CAPA portion. Thus, it is possible to stably extract the wobble signal using, in a DVD-RAM apparatus, a wobble signal extraction circuit that is used in a CD-R/RW apparatus as it is, without setting the acceptable input amplitude range of the subtracter to be particularly large.

Note that the enabling/disabling of the signal switcher 28 depending on the type of an optical disk placed in the optical disk apparatus is similar to the enabling/disabling of the signal level fixing sections 24a and 24b in the first embodiment.

The embodiments have been described above with respect to a DVD-RAM apparatus merely for the purpose of illustration, and the present invention is not limited to this. With DVD-R/RW, the DC level and the amplitude level of the optical disk signals vary rapidly when reading a land pre-pit area. Therefore, by replacing "CAPA portion" with "land pre-pit area" as necessary in the above description, the present invention can also be carried out with a DVD-R/RW apparatus to provide the effects as described above.

INDUSTRIAL APPLICABILITY

The wobble signal extraction circuit of the present invention realizes a stable wobble signal extraction for various types of optical disks with a circuit scale and a power consumption that are comparable to those of conventional circuits, and is therefore useful as a wobble signal extraction circuit in an optical disk apparatus compatible with both CD-R/RW and DVD-RAM/R/RW.

The invention claimed is:

1. A wobble signal extraction circuit for extracting a wobble signal from a first optical disk signal containing a wobble signal component caused by a wobble formed on a surface of an optical disk and a second optical disk signal containing a wobble signal component of a reversed phase to that of the first optical disk signal, comprising:
   a signal switcher for selectively outputting one of the first and second optical disk signals; and
   a subtracter for subtracting a signal output from the signal switcher from the first optical disk signal,
   wherein the signal switcher outputs the first optical disk signal when the discontinuity of the wobble is detected.

2. The wobble signal extraction circuit of claim 1, wherein:
   the optical disk is in compliance with a DVD-RAM standard; and
   the discontinuity of the wobble is a CAPA portion.

3. The wobble signal extraction circuit of claim 1, wherein:
   the optical disk is in compliance with a DVD-R/RW standard; and
   the discontinuity of the wobble is a land pre-pit area.

4. An optical disk apparatus, comprising the wobble signal extraction circuit of claim 1.

* * * * *